(12) United States Patent
Conejo et al.

(10) Patent No.: US 11,081,138 B2
(45) Date of Patent: Aug. 3, 2021

(54) SYSTEMS AND METHODS FOR AUTOMATED MUSIC REARRANGEMENT

(71) Applicant: Apple Inc., Cupertino, CA (US)

(72) Inventors: Bruno Jospeh Martin Conejo, Portland, OR (US); Rudolph van der Merwe, Portland, OR (US); Nicholas Wayne Henderson, Portland, OR (US); Alex Tremain Nelson, Portland, OR (US); Nikhil P. Singh, Portland, OR (US)

(73) Assignee: Apple Inc., Cupertino, CA (US)

( * ) Notice: Subject to any disclaimer, the term of this patent is extended or adjusted under 35 U.S.C. 154(b) by 55 days.

(21) Appl. No.: 16/147,411

(22) Filed: Sep. 28, 2018

(65) Prior Publication Data

US 2020/0105303 A1    Apr. 2, 2020

(51) Int. Cl.
  *G11B 31/02*    (2006.01)
  *G11B 27/036*   (2006.01)
  *G06F 16/683*   (2019.01)

(52) U.S. Cl.
  CPC .......... *G11B 27/036* (2013.01); *G06F 16/683* (2019.01)

(58) Field of Classification Search
  CPC .............. G10H 1/0025; G10H 1/383; G10H 2210/066; G10H 2210/081; G10H 2210/11; G10H 2220/111; G10H 2240/075; G10H 2210/335; G10H 2230/031; G10H 1/36; G10H 2210/111; G10H 2250/015; G10H 1/38; G10H 2240/175; G10H 2240/305; G06F 3/0481; G09B 15/00; G09B 15/04; G11B 31/02
  USPC ........ 84/367, 613, 609, 611, 616, 622, 625; 381/119, 98; 704/270, 278
  See application file for complete search history.

(56) References Cited

U.S. PATENT DOCUMENTS

| | | | |
|---|---|---|---|
| 7,985,917 B2* | 7/2011 | Morris ................. | G10H 1/0025 84/610 |
| 9,251,776 B2* | 2/2016 | Serletic, II .............. | G10H 1/38 |
| 9,257,053 B2* | 2/2016 | Rassool .............. | G10H 1/0025 |
| 9,310,959 B2* | 4/2016 | Serletic, II ............ | G06F 3/0481 |
| 9,672,800 B2* | 6/2017 | Gozzi ................. | G10H 1/0025 |
| 9,779,268 B1* | 10/2017 | Colgrove ................ | G06F 21/78 |
| 2009/0064851 A1* | 3/2009 | Morris ................... | G10H 1/383 84/637 |
| 2010/0192755 A1* | 8/2010 | Morris ..................... | G10H 1/36 84/637 |

(Continued)

*Primary Examiner* — Vijay B Chawan
(74) *Attorney, Agent, or Firm* — Womble Bond Dickinson (US) LLP

(57) ABSTRACT

A method and apparatus of a device that builds a target using a plurality of processing units is described. In an exemplary embodiment, the device receives an input audio track having a first duration, the input audio track having a plurality of points. The device further generates a transition matrix of the input audio track, wherein the transition matrix indicates a similarity metric between different pairs of the plurality of points. In addition, the device determines a set of jump points using the different pairs of the plurality of points. The device additionally generates the rearranged audio track using the set of jump points, wherein the rearranged audio track has second duration and the second duration is different than the first duration.

21 Claims, 14 Drawing Sheets
(4 of 14 Drawing Sheet(s) Filed in Color)

(56) References Cited

U.S. PATENT DOCUMENTS

| | | | |
|---|---|---|---|
| 2014/0053711 A1* | 2/2014 | Serletic, II | G06F 3/0481 |
| | | | 84/611 |
| 2014/0140536 A1* | 5/2014 | Serletic, II | G10H 1/383 |
| | | | 381/98 |
| 2019/0049968 A1* | 2/2019 | Dean | G05D 1/0088 |

* cited by examiner

SYSTEMS AND METHODS FOR AUTOMATED MUSIC REARRANGEMENT

FIELD OF INVENTION

This invention relates generally to audio processing and more particularly to rearranging an audio track.

BACKGROUND OF THE INVENTION

A user may wish to use a short audio segment as background music for video and/or photo collage. The collage can be generated by a device and/or by the user. A problem with this is that the length of the collage is shorter than a typical audio track. For example, a collage of several photos and/or video clips may be on the order of 45-75 seconds, whereas a song that the user may wish to use can be on the order to three minutes or longer. Thus, the lengths of the songs can be much longer than collage.

A user could use a clip of the proper length from a desired song, but that clip may not follow the intended artistic progression. For example, the short audio clip of the song may miss an intro, body, or outro.

SUMMARY OF THE DESCRIPTION

A method and apparatus of a device that builds a target using a plurality of processing units is described. In an exemplary embodiment, the device receives an input audio track having a first duration, the input audio track having a plurality of points. The device further generates a transition matrix of the input audio track, wherein the transition matrix indicates how similar different pairs of the plurality of points are. In addition, the device determines a set of jump points using the different pairs of the plurality of points. The device additionally generates the rearranged audio track using the set of jump points, wherein the rearranged audio track has second duration and the second duration is different than the first duration.

In a further embodiment, a machine-readable medium having executable instructions to cause one or more processing units to perform a method to rearrange an input audio track into a rearranged audio track. The machine-readable medium method receives an input audio track having a first duration, the input audio track having a plurality of points. The machine-readable medium method further generates a transition matrix of the input audio track, wherein the transition matrix indicates a similarity metric between different pairs of the plurality of points. In addition, the machine-readable medium method determines a set of jump points using the different pairs of the plurality of points. The machine-readable medium method additionally generates the rearranged audio track using the set of jump points, wherein the rearranged audio track has second duration and the second duration is less than the first duration.

Furthermore, the rearranged audio track is a set of non-contiguous audio subsets coupled via the set of jump points. In addition, a jump point is a jump from one point in the input audio track to another point in the input audio track and a point is selected from the group consisting of a beat, a bar, a segment, and a section. The machine-readable medium method further computes the transition matrix by decomposing the input audio track into a percussive track and a harmonic track, and chunking these into input features via the computation of a perceptual Mel power spectrograms and perceptual CQT power spectrograms that captures different audio characteristics such as transients, rhythm, dynamics, timber, harmony, tone and texture. In addition, the features include transients, timber, and notes. The machine-readable medium method additionally computes the transition matrix using a machine learning based approach operating on the computed features.

In additional embodiment, a method that rearranges an input audio track into a rearranged audio track. The method receives an input audio track having a first duration, the input audio track having a plurality of points. In additional, the method generates a transition matrix of the input audio track, where the transition matrix indicates a similarity metric between different pairs of the plurality of points. The method further determines a set of jump points using the different pairs of the plurality of points. The method additionally generates the rearranged audio track using the set of jump points, where the rearranged audio track has second duration and the second duration is different than the first duration.

In a further embodiment, a device that rearranges an input audio track into a rearranged audio track, where the device includes at least one processing unit, memory coupled to the at least one processing unit, and a process executed from the memory by the processing unit. In addition, the processing causes the processor to receive an input audio track having a first duration, the input audio track having a plurality of points, generate a transition matrix of the input audio track, wherein the transition matrix indicates a similarity metric between different pairs of the plurality of points, determine a set of jump points using the different pairs of the plurality of points, and generate the rearranged audio track using the set of jump points, wherein the rearranged audio track has second duration and the second duration is different than the first duration.

Other methods and apparatuses are also described.

BRIEF DESCRIPTION OF THE DRAWINGS

The present invention is illustrated by way of example and not limitation in the figures of the accompanying drawings in which like references indicate similar elements. The patent or application file contains at least one drawing executed in color. Copies of this patent or patent application publication with color drawing(s) will be provided by the Office upon request and payment of the necessary fee.

DETAILED DESCRIPTION

Figure 1:
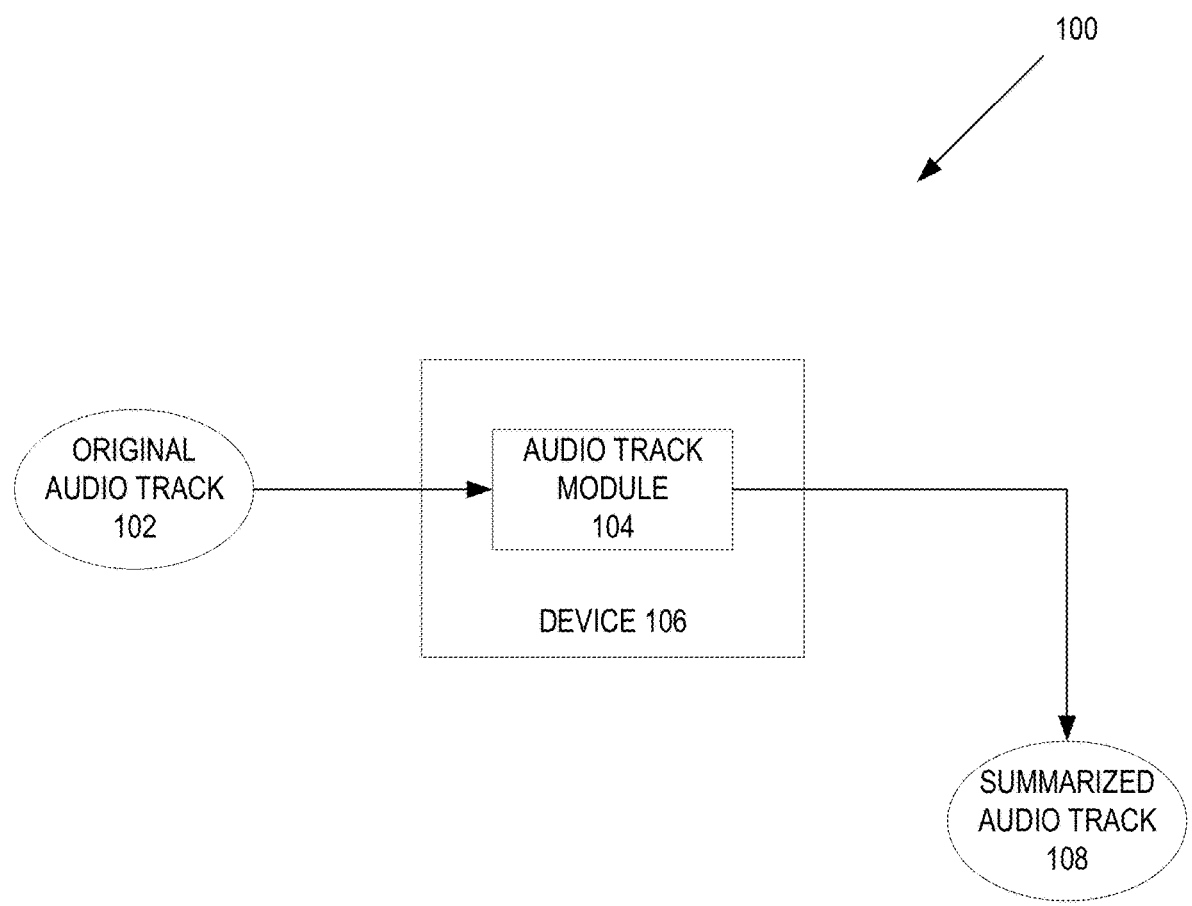
FIG. 1 is a block diagram of one embodiment of a system for rearranging an audio track.

A method and apparatus of a device that rearranges an audio track is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that rearranges an audio track is described. In one embodiment, the device receives an audio track to summarize. In this embodiment, a rearranged audio track is a set of potentially non-contiguous audio subsets in the input audio track that are appended together that is musically pleasing and ascetic. The audio subsets can be composed of beats, bars, segments, and/or sections. In this embodiment, two subsets are non-contiguous when the beginning of one subset which starts later in time than the beginning of the other, is separated in time from the end of this other subset. Thus, two audio subsets are non-contiguous when there is a jump between the subsets.

The device further determines a transition matrix for the audio track using a machine learning based approach. The transition matrix is a matrix of similarity scores between different pairs of points in the audio track. Points that are similar have scores that indicate the similarity and are more likely candidates for transitions or jumps for rearranged audio track. In one embodiment, the device computes the transition matrix by computing features of the audio track (e.g., transients, timber, and/or notes) and performs machine learning based inference to determine the similarities. With the transition matrix, the device can computes different starting and/or jump points that are used to generate the rearranged audio track.

FIG. 1 is a block diagram of one embodiment of a system 100 for rearranging an audio track. In FIG. 1, the system 100 includes an original audio track 102 that is processed by device 106, where the device 106 outputs the rearranged audio track 108. In one embodiment, the original audio track can be a song, movement, melody, nature sounds, bird sounds and/or any other type of audio track. In one embodiment, the input audio track will have a structure, such as having one of more of different types of segments (e.g., intro, verse, chorus, solo, outro, and/or other types of segments).

In one embodiment, a rearranged audio track for a song generated by a human curator can be used. A rearranged audio track is a sampling of the audio track, such that the resulting rearranged audio track has an aesthetically pleasing construction (e.g., intro, body, outro) that follows the intended artistic progression. In one example, a multi-track source audio material is used along with a manually constructed transition table to construct and render output audio of a desired length. In this example, expert human editors carefully audition the audio track to identify which sections of the audio track can be played into other sections. For example, if an audio track includes the following segments: an intro, verse, chorus, verse, chorus, solo, chorus, outro, the human editors determine if one of the segments can be played after another (e.g., solo played after the second verse) as a way to rearrange the audio track. Using this analysis, the human editor can construct a transition table that can be used to generate the rearranged audio track. A problem with using a human editor to construct the transition table is that this is very time and labor intensive, which limits that number of audio tracks that can be effectively rearranged to a small number of well-known audio tracks.

In one embodiment, the device analyzes the original audio track 102 to generate a transition matrix. In this embodiment, the transition matrix is a matrix that can be used to identify similarities and/or dissimilarities to between pairs of points of the original audio track. Pairs of points in the audio track are similar if notes, timber, and/or transients of the corresponding points are similar. Similar pairs of points are more likely to be candidates for transitions (or jumps) between the two points. In one embodiment, a transition or jump between similar points is a way to rearrange the audio track while preserving a pleasing and plausible structure of the original audio track. For example and in one embodiment, the rearranged audio track should not have noticeable auditory jumps in note, timber, or transients to the person listening to the rearranged audio track.

In one embodiment, the device 104 generates the transition matrix for an original audio track 102 once per track and can be used generate a number of different length rearranged audio tracks. In this embodiment, this is because the transition matrix relates similarities between different pairs of points within the original audio track. In one embodiment, a point can be a beat, bar, segment, or section of the audio track. In this embodiment, the beat is the basic unit of time, the pulse (regularly repeating event), of the mensural level (or beat level). The beat is often defined as the rhythm listeners would tap their toes to when listening to a piece of music, or the numbers a musician counts while performing, though in practice this may be technically incorrect (often the first multiple level). In popular use, beat can refer to a variety of related concepts including: pulse, tempo, meter, specific rhythms, and groove. In addition a bar is set of one or more beats. A segment is a set of one or more bars that are part of defined collection of bars, such as an intro, verse, chorus, solo, outro, and/or another segment. A section is a set of one or more segments.

In one embodiment, because the transition matrix is can be defined based on individual beats, the rearranged audio track can have transitions (or jumps) with audio segments. For example and in one embodiment, there can be a jump from within one chorus into the middle of the second chorus. Thus, in this example, the transition are not limited to be between similar sounding audio segments (e.g., intro, verse, chorus, solo, outro, etc.), but can be between beats in different parts of the audio track. This gives additional flexibility to determine a wider variety of rearranged audio tracks than available using human curated audio segments.

In one embodiment, with the generated transition matrix for the song, the device 104 can render a rearranged audio track 108 with a desired length. In this embodiment, by generating the transition matrix for the song, different rearranged audio tracks 108 of differing lengths can be generated by the device based on the desired length input by the user.

Figure 2A:
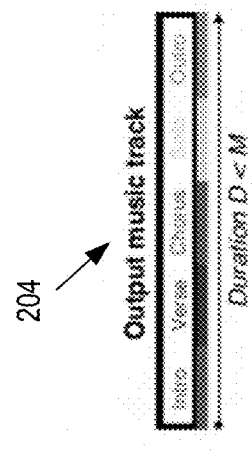
FIGS. 2A-C are illustrations of embodiments of a transition matrix for an audio track.
Figure 2C:
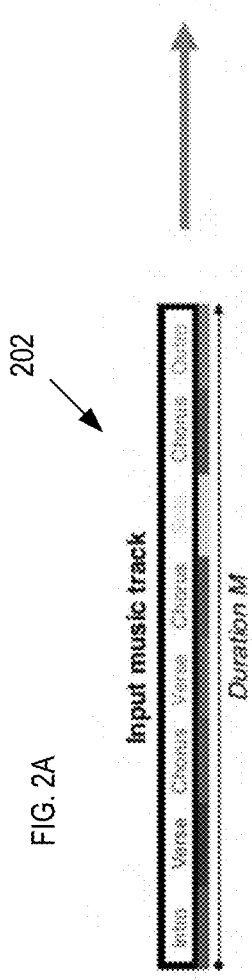
Figure 2C:
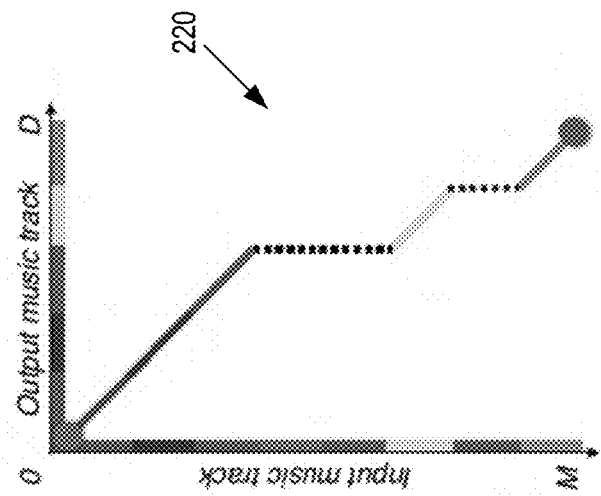
Figure 2B:
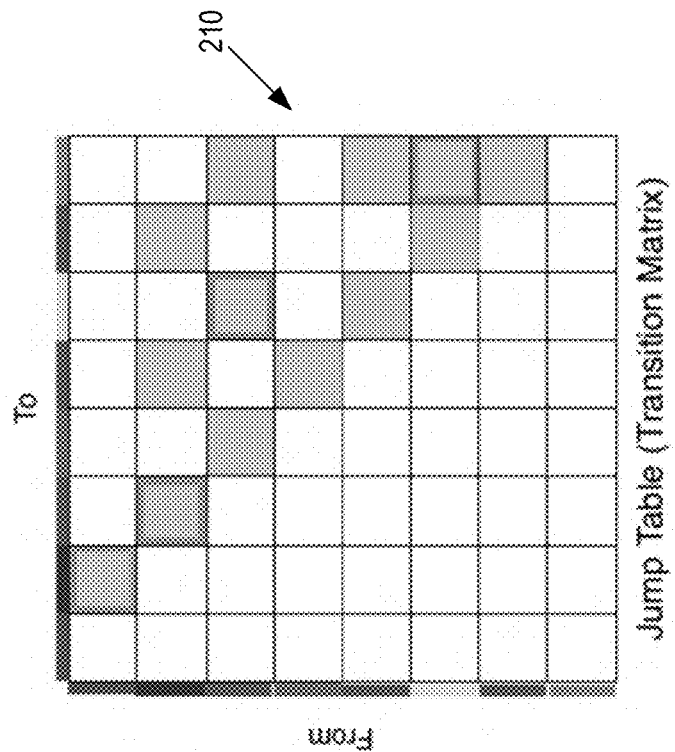

FIGS. 2A-C are illustrations of embodiments of a transition matrix for an audio track. In FIG. 2A, an input music track (or audio track) includes different audio segments, such as an intro, first verse, first chorus, second verse, second chorus, solo, third chorus, and an outro. In one embodiment, a human editor could determine that an output music track 204 (or rearranged audio track) would include the intro, first verse, second chorus, and outro from the original audio track 202. The output music track 204 would have a duration D, that is different (longer or shorter) than the duration of the input music track 202, having a duration M.

In FIG. 2B, a jump table or transition matrix 210 for an input music track is illustrated. In one embodiment, the jump table (transition matrix) 210 indicates possible jumps (or transitions) between the different audio segments of the music track. For example and in one embodiment, possible jumps can exist from the intro to first verse segments, first verse to first chorus segments, first chorus to second verse segments, first chorus to solo segments, solo to outro segments, and/or other possible jumps. From these possible jumps, the output music track can be constructed as illustrated in FIG. 2C (output music track 220). In FIG. 2C, the output music track 220 includes segments intro, first verse, first chorus, solo, and outro.

In one embodiment, a problem with constructing the output music track 220 using the jump table 210 is the jump table 210 is that the jump table 210 is constructed by human editors, which is very time laborious and does not scale for large numbers of different songs. In addition, by constructing jumps between identified segments, is that the segments are coarse grained, as there are a relatively small number of segments for possible jumps.

Figure 3:
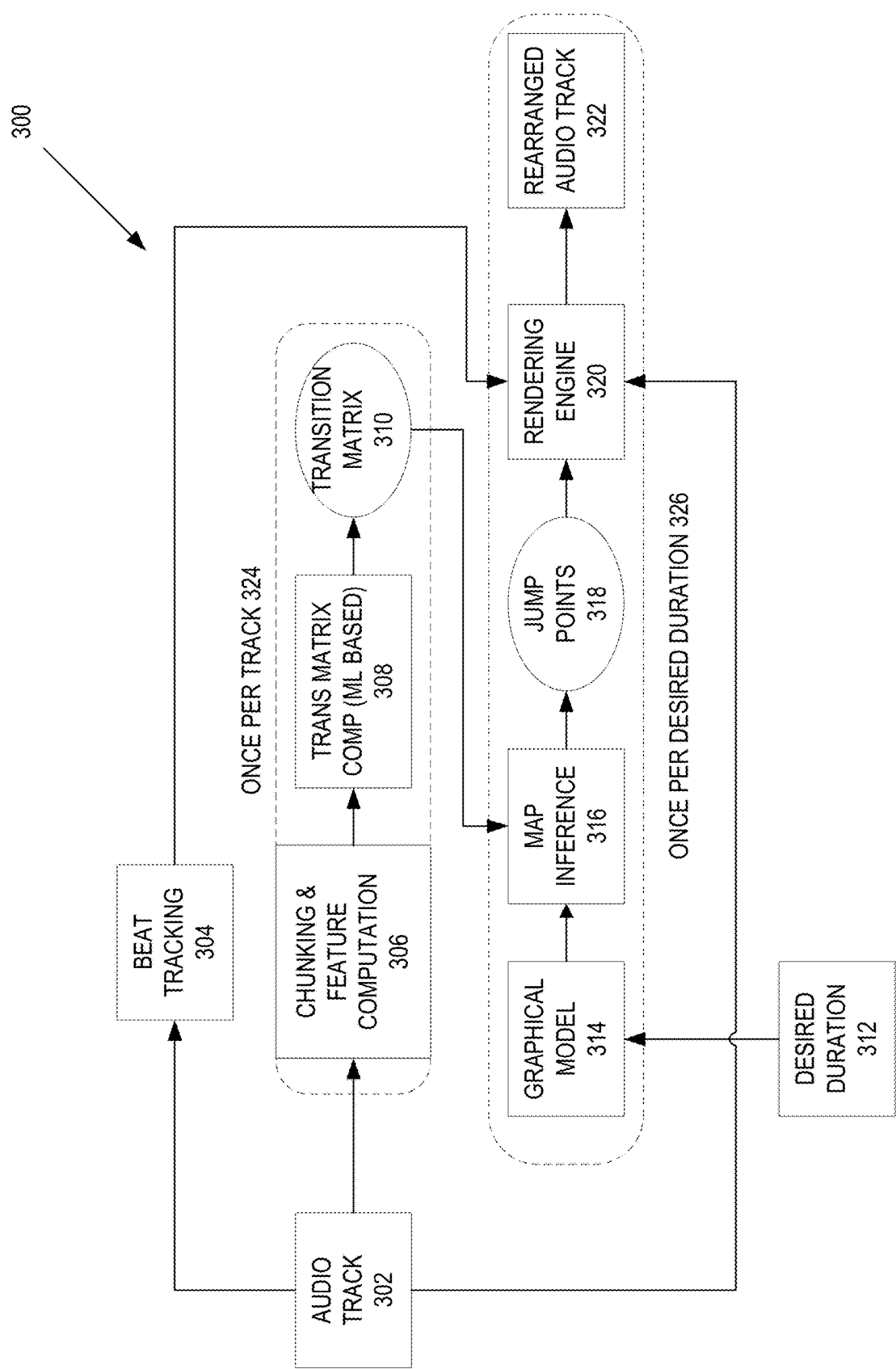
FIG. 3 is an illustration of one embodiment of a system that rearranges an input audio track to a desired length.

Instead of using a small number of human curated audio segments to determine the jump table (transition matrix), in one embodiment, a device determines the transitions matrix for a song using machine learning. FIG. 3 is an illustration of one embodiment of a system that rearranges an input audio track to a desired length. In FIG. 3, a system 300 includes an audio track 302 that is used as an input audio track. In one embodiment, the audio track is a song, movement, music segment, and/or other type of audio track defined above. In one embodiment, the system 300 is the device 106 as described in FIG. 3 above. In one embodiment, the system 300 performs a series of operations on the audio track 324, once per track. The chunking and feature computation 306 operation determines the features of the audio track 302, such as but not limited to the notes, timber, and transients for this audio track. In one embodiment, these features can be used to determine the transition matrix for the audio track 302. Computing the features is further described in FIG. 4 below.

At operation 308, the system computes a transition matrix using machine learning and outputs the transition matrix 310. In one embodiment, the transition matrix 310 is a matrix of similarities between pairs of points in the audio track 302. If a pair of points is similar in one or more of notes, timber, and/or transients, this pair of points can be used as a jump in time in the audio track for the rearranged audio track. Conversely, if a pair of points are dissimilar, this pair of points would not be a likely candidate for a jump in time for the rearranged audio track. The transition matrix is further described in FIGS. 6 and 7 below.

In one embodiment, to generate the rearranged audio track for a desired duration 312, the system 300 performs the set of operations 326. In one embodiment, the desired duration is an amount of time that is different than the duration of the audio track 302. The desired duration 312 can be determined based on the length of the collage, input by the user, or determined from some other way. In one embodiment, the rearranged audio track can be used for other purposes (e.g., generating a song rearrangement in a digital musical store, an advertisement, entertainment (e.g., television, radio, web, and/or other forms of entertainment utilizing an audio track), and/or any other place where an audio rendition of an audio track is used that is a different length that an original audio track. Using the desired duration, the system 300 generates a graphical model at operation 314. In one embodiment, the graphical model is a probabilistic model for which a graph expresses the conditional dependence structure between random variables.

At operation 316, the system 300 performs graphical model based MAP inference using the transition matrix 310 to produce the per track meta data (jump points) needed by the rendering engine (320) to construct the rearranged audio track (322).

In one embodiment, the system 300 provides a starting point for the rearranged audio track. In this embodiment, the starting point for the rearranged can be critical for the overall user experience of the rearranged audio track. In one embodiment, simply starting the rearrangement from the actual song intro is often not possible especially while requesting summaries with very short durations from the inputted audio track. In an alternative embodiment, starting the rearranged audio track at alternate locations in the track can provide opportunities to create summaries having consistent musical structure with pleasant endings within the desired duration.

In one embodiment, the primary challenge in finding alternative music entry points is that the musicians intend to create only one intro for a song, and the music is intended to be listened to from the start. Thus, to provide entry point recommendations beside the song's actual intro, can be accomplished using three different possible models under the following hypotheses: (i) Music following long pauses or silences can make good starting frames; (ii) Music starting near repeated sections can make a pleasant intro for short renditions; and/or (iii) For some songs, there exist 'intro-like' frames in the music other than the song intro.

In one embodiment, based on the above hypotheses, following are the three models for entry point recommendations. Contiguous silence based:
  Compute perceptually weighted loudness.
  Detect contiguous silent regions (pauses and breaks) using loudness.
  Entry points are the beats following the detections.
Repetitions and boundary based:
  Compute pair-wise similarity in audio using similarity module in "Finding jumps section".
  Detect approximate contiguous repeated sections using pair-wise similarity information.
  Detect onsets and boundaries as candidate entry points.
  Accept the candidates proximal to the beginning of the repeated sections as entry points.
Learning based:
  Train a neural network to predict good candidates for entry points
    Leverage the transition feature network that has learnt a music embedding space from transition module presented in the "Finding jumps" section.
    Within the embedding space, train a subnetwork to detect regions in a track that best transition from silence to music and sound like music intros.
    The training data comprise of a collection of short examples of music beginnings (intros).

With the entry point determined for the rearranged audio track, the system 300 finds the jumps using the transition matrix. In one embodiment, the system 300 finds the jumps by using an algorithmic sub-system responsible for estimating if two audio segments of the original track sound pleasant when played one after another. Thus, the system 300 can use two different estimation techniques. In addition, and in one embodiment, system 300 determines exit points for the input audio track. In this embodiment, the exit point can be at the end of the input audio track, or another part of the input audio track that is not at the end. For example and in one embodiment, the actual outro of the input audio track may not be used to produce a pleasant sounding summary, so the exit point of the input audio track may be a part of the input audio track that is before the outro.

In one embodiment, the system estimates jumps derived from similarity estimation. In this embodiment, if two audio segments, A and B for instance, are perceived as similar by a listener the system 300 can jump from any part of the segment A to its corresponding part in segment B. When the jump happens, the listener will not be able to account for it since the audio content is similar. The system 300 estimates the similarity between audio segments by using deep learning techniques. In this embodiment, there is not a consensus or a ground truth dataset for learning if musical similarities exist between segments. Hence, in the absence of markups, the system 300 trains a model by randomly sampling from the stereo channels within a song and across several songs to automatically derive musical similarities data. For instance, if sampled at the same location, the segment from the left and right channel of a stereo track is very likely to be similar. However, two segments sampled from different non-overlapping location in a track or two different tracks are likely to be dissimilar. By sampling segments in this fashion, the system 300 can create a statistical model for that audio track without requiring any human curation. Since, this model is statistically correct, the system 300 also designs robust training losses to mitigate the effect of outliers. Such outliers come from segments extracted from repeated part such as choruses that these sampling techniques incorrectly labeled as dissimilar.

In another embodiment, the system 300 derives jumps transition estimation. In this embodiment, the system 300 uses a more natural approach, but also more challenging, that directly estimates if the audio content formed by a segment A followed by a segment B is musically pleasant. If the formed segment AB sounds good, then the listener will not be able to account for a jump that will go from the end of segment A to the beginning of segment B. In this embodiment, the system 300 estimates the likeliness of a transition between two audio segments leveraging using a deep learning approach. As for similarity, there does not exist a consensus or a ground truth dataset for learning musical transition exist. Hence, in the absence of markups, the system 300 trains a model by randomly sampling contiguous segments to automatically derive statistically good transitions. In one embodiment, the training of the deep neural network here is performed over a very large set of audio tracks across multiple musical genres. This set of audio tracks (called the development set), is distinct from the 'input audio track' referred to above. The system 300 further randomly samples not contiguous segments of the same song to automatically derive statistically bad transitions. The system 300 can further design robust losses to mitigate the effect of outliers in the training targets. For instance, since the chorus repeats multiple times in a song, any transition between the first time the chorus is played and the second time the chorus is played will be sounding good but not contiguous segments, and hence incorrectly labelled in the statistical ground truth.

In addition, and in one embodiment, once the system 300 has estimated jumps using the two approaches presented above, the system 300 applies a fusion technique to obtain a single set of admissible jumps. The fusion can be parametrize in different ways, but the system currently allows jumps from both approaches by adding, to each jump, a priority score:
  Jumps found by both estimation technique have a high priority score,
  Jumps found by the similarity estimation technique have a medium priority score,
  Jumps found by the transition estimation technique have a low priority score.

In this embodiment, the system 300 has determined a set of possible jumps points within the transition matrixes. In one embodiment, the jump points are a pair of discontinuous points in the song that form a musically pleasant sounding segment if an audio segment ending with one point of the jumps sound similar to when played before an audio segment starting with the other jump point. To generate the rearranged audio track, the system 300 uses the jump points to create a musically pleasant sounding audio track with the desired duration.

In one embodiment, system 300 uses a deep neural-network (DNN) based jump point estimation model is able to find good jump points to produce a rearrangement of a piece of music. Sometimes, these jump points need to be refined at a finer scale than that which is used by the DNN based model. Without jump point refinement, there are sometimes undesirable residual audio artifacts in the rearrangement, such as phase cancellation, loudness inconsistencies, tempo issues, or sudden truncation of musical features. In one embodiment, the system 300 uses a second deep neural-network trained to use features at a higher frequency. This jump point refinement model is able to look at the pre and post jump audio signals and select optimal offset, cross-fade, and volume adjustment parameters to make a seamless progression over the jump.

In one embodiment, the system 300 sets up a graphical model where the nodes define the segments of the composition, where each node has to select a unique segment of the original song. The system 300 enforces the compositing rules by adding factor on each node and between each node to encode the probabilities of:
staring from a given segment (only for the first node), including a segment,
joining the two segment in the composited rendition, ending in a given segment (only for the last node).

The probability of joining two segments is induced by the admissible set of jumps. If two segment form an admissible jump, then its joining probability comes from the priority score defined during by the fusion (see paragraph Fusion of estimated jumps). If the two segments do not form an admissible jump, then its joining probability is set to 0.

Running inference on this model provides a list of the most probable segments for a song. Finally, a simple cross-fading between a sequence of non-contiguous segments suffices to render an appealing song of the desired length.

At operation 320, the system 300 uses a signaling block to generate video cues for the rearranged audio track. In one embodiment, when a user views videos or slide shows with musical accompaniment, the experience is improved if the transitions in the video (e.g., from one scene to another) are synchronized with the transitions in the music (e.g. from verse to chorus). This is referred to the time-points of such musical transitions as "video cues." By identifying video cues, the system 300 allows for cut-points in the video to be adjusted to coincide with the musical transitions.

Music (such as the audio track) typically contains transitions at multiple levels. The system identifies different levels of video cues so that preference can be given, for example, to aligning the video cut-points to higher level transitions over low level transitions. In this embodiment, the goal is for the system 300 to automatically determine a hierarchy of partitions in a song rearrangement, which can be used as cues for changes in an accompanying slideshow or video. The partitioning could include the following:
 beat scores: the amount of acoustic change at each beat.
 bars (measures): the amount of acoustic change at each bar.
 segments: the time boundaries between contiguous groups of bars which are acoustically related or form a musical phrase.
 sections: the time boundaries of larger contiguous parts of the song rearrangement, such as chorus, verse, bridge, which together constitute the structure of the song rearrangement.

The input will include the audio of the rearrangement, and the times of beats and bars. In addition, the rearrangement transitions and the similarity and transition matrices that are computed when generating the rearrangement can also be used. In one embodiment, analysis of the musical rearrangement involves three concepts:
 Repetition: identify segments of audio that occur more than once.
 Homogeneity: identify segments of audio which are internally consistent.
 Novelty or Change: identify boundaries between homogenous segments, or between homogenous and nonhomogeneous segments.

Figure 4:
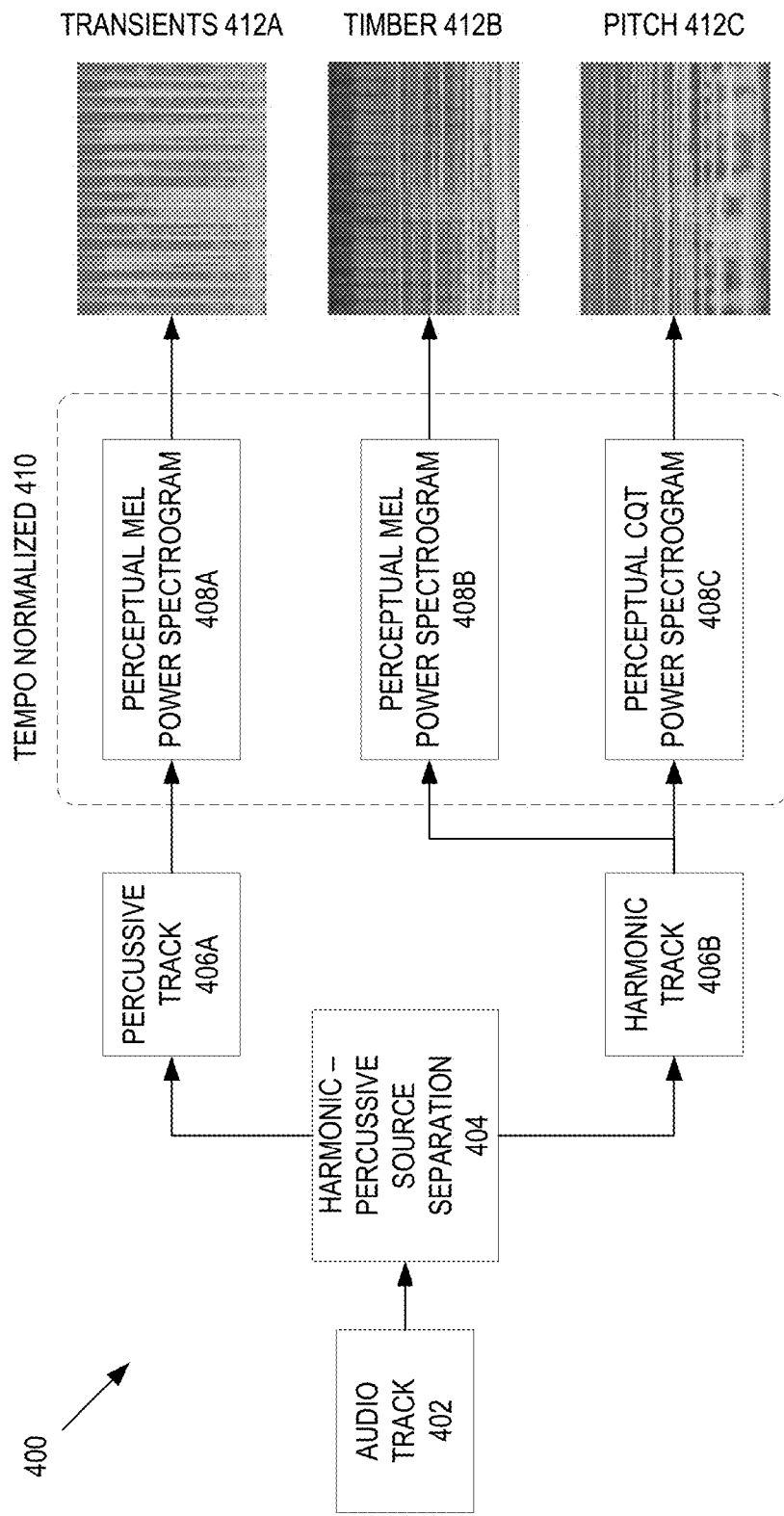
FIG. 4 is an illustration of one embodiment of transforming an audio track into separate spectrograms.

As described above and in one embodiment, the system 300 chunks the input audio track and computes the features of the audio track. In this embodiment, the system 300 separates the audio track into separate percussive and harmonic tracks and computes features using those tracks. FIG. 4 is an illustration of one embodiment of transforming an audio track 402 into separate spectrograms. In FIG. 4, the system 400 receives the audio track and performs a harmonic-percussive source separation. In one embodiment, the system 400 is the device 106 as described in FIG. 4 above. In one embodiment, the system 400 performs the harmonic-percussive source separation by applying non-linear filters to the spectrogram in order to filter out these components. Performing the harmonic-percussive source separation, results in the percussive track 406A and harmonic track 406B. The system 400 further computes spectrograms on each of the tracks 406A-B to computes the features. In one embodiment, the system 400 computes a perceptual Mel power spectrogram 408A of the percussive track 406A to generate transients 412A features of the audio track 402. In addition, the system 400 computes a perceptual Mel power spectrogram 408B of the harmonic track 408B to generate timber 412B features of the audio track 402. Furthermore, the system 400 computes a perceptual CQT power spectrogram 408C of the harmonic track 408B to generate pitch 412C features of the audio track 402. In one embodiment, these features 412A-C are used by the machine learning algorithm to generate the transition matrix below.

Figure 5:
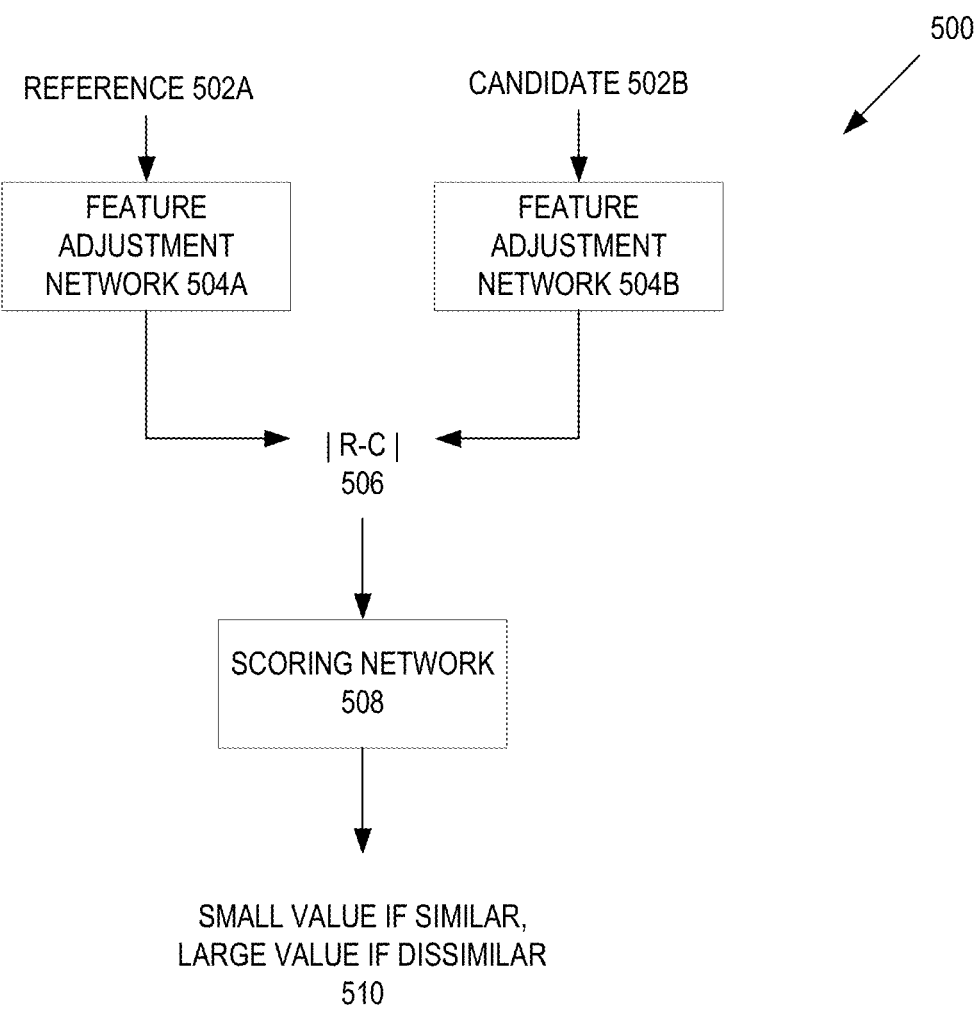
FIG. 5 is an illustration of one embodiment of using machine learning to generate a transition matrix for the audio track using machine learning to generate the entries in a transition matrix or table for an audio track.

FIG. 5 is an illustration of one embodiment of using machine learning to generate a transition table for the audio track using machine learning to generate the entries in a transition matrix or table for an audio track. In FIG. 5, a system 500 computes similarity values using the features computed in FIG. 4 above by using these features as inputs to two sub-neural networks (one for the reference, and one for the candidate). The output of each is then compared by a scoring network. In one embodiment, the system 500 creates multiple audio chunks from the input audio track. In this embodiment, each audio chunk can be a beat, a bar, a segment, and a section of the input audio track. For each of the audio chunks, define this audio chunk as a reference. The system 500 further computes similarities between the reference audio chunks and the other audio chunks. In addition, the system 500 sets all transitions between pairs of audio chunks as being not possible and allow transitions between temporally successive chunks (e.g., chunk (j, j+1). The system 500 additionally sets transitions (j, k: k j≠1, k>j) that are similar as allowable. The system 500 further sets nearby transitions as allowable (e.g., j−1→k, j→k+1, k−1→j, k→j+1). For example and in one embodiment, assume there are 8 chunk and chunks 2 and 6 are similar. The transition 2→6 is allowed. In addition, 2→7, 5→2, 6→3, and 1→6 are allowable.

Figure 6:
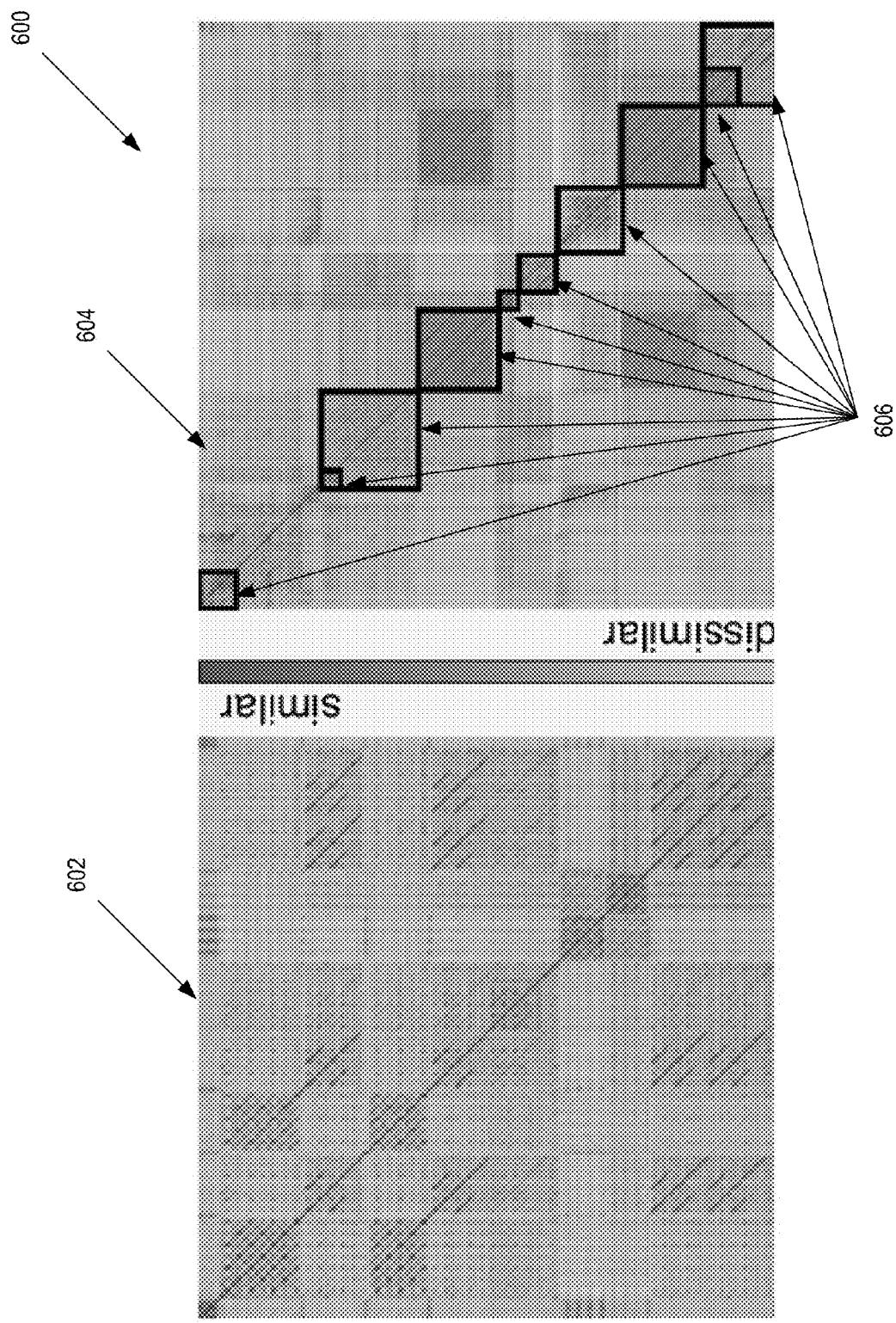
FIG. 6 is an illustration of one embodiment of transition matrix for an audio track.

In one embodiment, the system 500 is the device 106 as described in FIG. 5 above. In one embodiment, the system 500 performs feature adjustments 504A-B to the reference 502A and candidate 502B transition matrices, respectively. In this embodiment, the feature adjustments are creates robustness to variations in the audio track, such as small temporal offsets due to beat mismanagement and small variations due to swing, human playing instruments, or humanization. The system 500 performs takes the difference 506 between the adjusted reference transition matrix 502A and the candidate transition matrix 502B. The system 500 scores the transition matrices 502A-B differences 508 for each point in the transition matrix difference. In one embodiment, the system 500 sets a small value if the two points are similar and sets a high value if the two points are dissimilar. In another embodiment, the system can set a high score for similar points and a low score for dissimilar points. In one embodiment, a network is trained to produce a low score for similar points and high score for dissimilar points. For example and in one embodiment, this is done by using a loss function that will penalize the network if it allocates a high score to a similar points (and respectively allocates a low score to a dissimilar points), FIG. 6 is an illustration of one embodiment of transition matrices 600 for an audio track. In FIG. 6, the transition matrix 602 is illustrated. In one embodiment, the transition matrix is a matrix of similarity values for points in the audio track. In this embodiment, the transition matrix 602 can be used to identify similar parts of the audio track that can be used for jumps within the audio track. In this embodiment, the x and y-axis represent time (seconds, beats, and/or some other measure in time of the audio track). In transition matrix 604, several potential jumps points are identified 606. In one embodiment, each of the potential jump points 606 are where the audio track can be jumped ahead with a minimal difference in the type audio being played at that instance of time.

Figure 7:
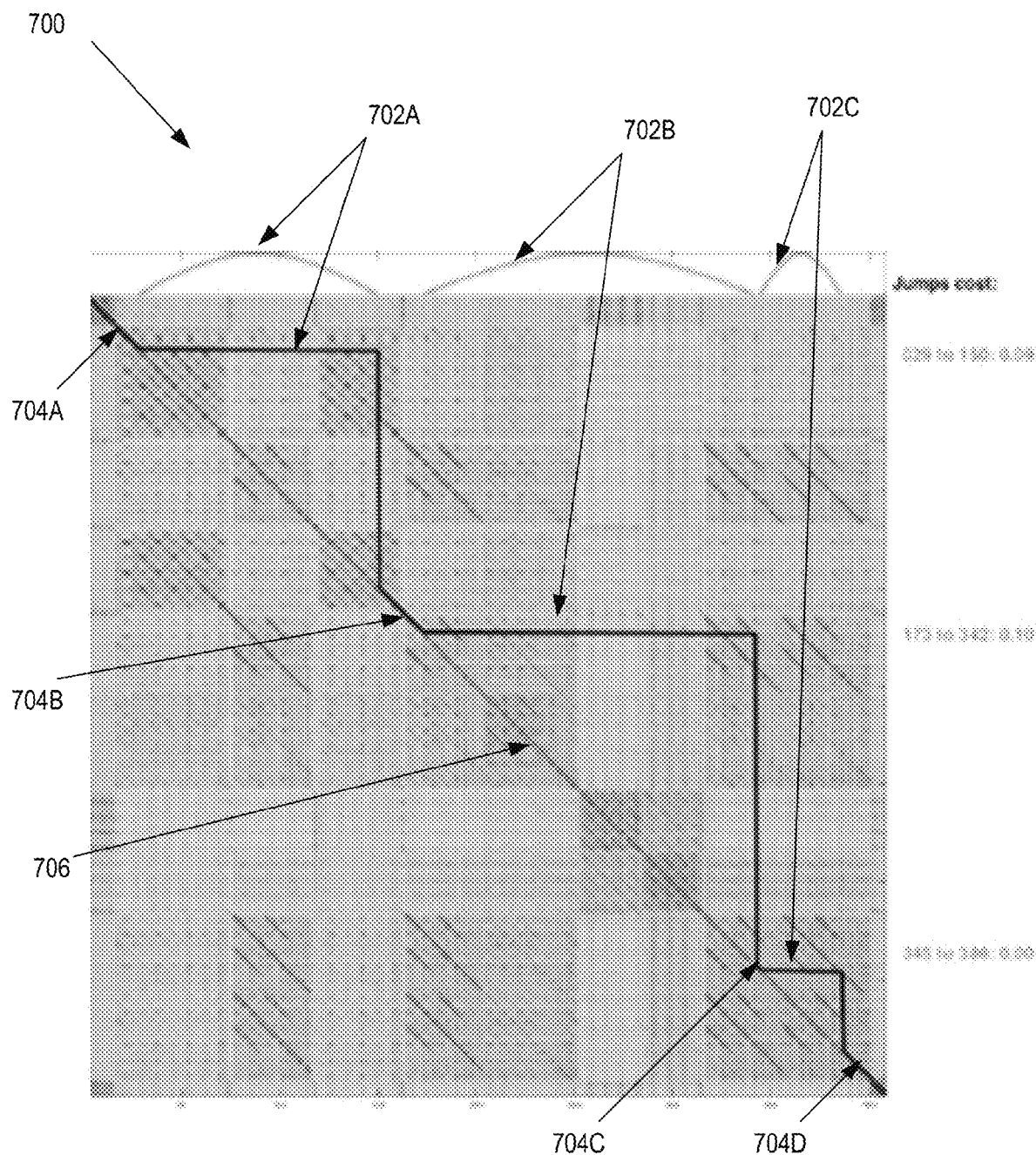
FIG. 7 is an illustration of one embodiment of using the transition table to generate the rearranged audio track.

FIG. 7 is an illustration of one embodiment of using the transition table 700 to generate the rearranged audio track. In FIG. 7, the transition matrix 700 has several identified jumps 702A-C in the audio track. The long diagonal 706 of the transition matrix 700 represents the original audio track. The jumps 702A-C represents jumps in the original audio track that is used to rearrange the original audio track. In one embodiment, the rearranged audio track the segments 704A-D assembled together. In this embodiment, the assembled audio tracks 704A-D has a duration that is less than the original audio track.

Figure 8:
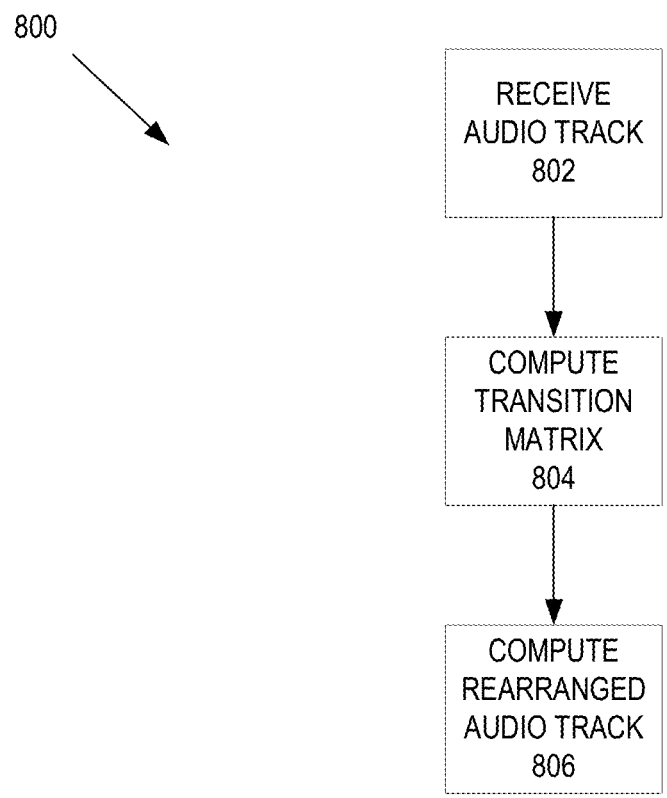
FIG. 8 is a flow diagram of one embodiment of a process to rearrange an audio track.

FIG. 8 is a flow diagram of one embodiment of a process 800 to rearrange an audio track. In FIG. 8, process 800 begins by receiving the audio track at block 802. At block 804, process 800 computes the transition matrix for the audio track. In one embodiment, process 800 computes the transition matrix by computing features and using machine learning as described in FIGS. 3-5 above. Process 800 computes the rearranged audio track at block 806. In one embodiment, process 800 computes the rearranged audio track using jump points in the transition matrix as described in FIG. 3 above.

Figure 9:
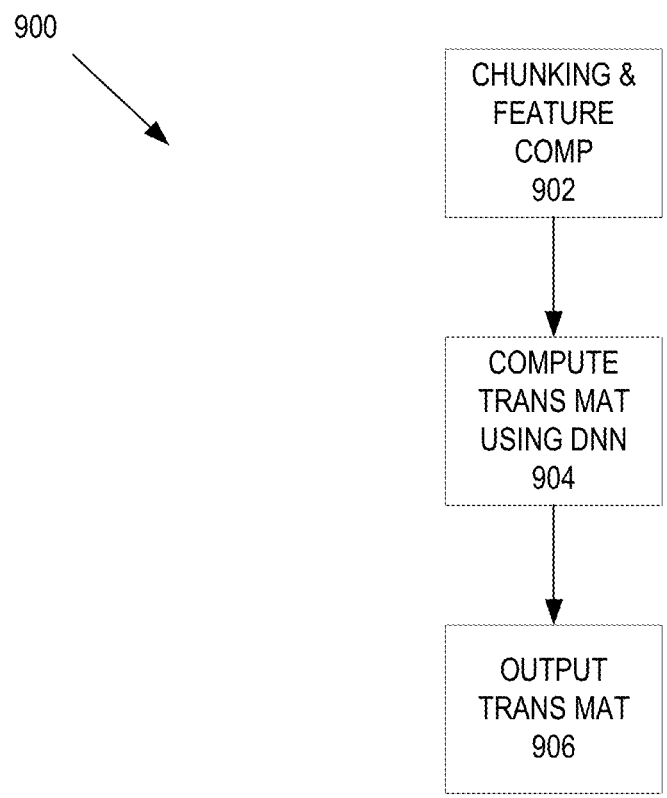
FIG. 9 is a flow diagram of one embodiment of a process to generate the transition matrix.

FIG. 9 is a flow diagram of one embodiment of a process 900 to generate the transition matrix. In FIG. 9, process 900 begins by chunking and feature computation at block 902. In one embodiment, process 900 chunks the audio track by separating the audio track into harmonic and percussive tracks. In addition, process 900 computes features of these tracks as described in FIG. 4 above. At block 904, process 900 computes the transition matrix using a deep neural network. In one embodiment, process 900 computes the transition matrix using the computes features and the deep neural network as described in FIG. 5 above. Process 900 outputs the transition matrix at block 906.

Figure 10:
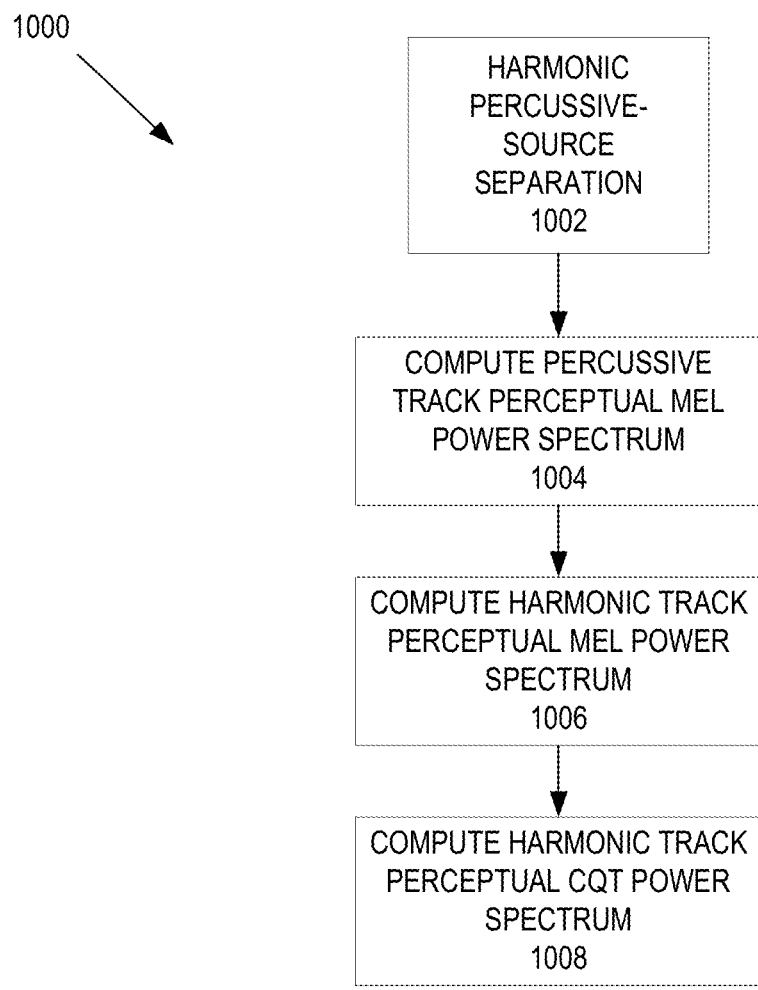
FIG. 10 is a flow diagram of one embodiment of a process to generate a number of power spectrum based features for the audio track.

FIG. 10 is a flow diagram of one embodiment of a process 1000 to generate a number of spectrograms for the audio track. In FIG. 10, process 1000 beings by separating the audio track into harmonic and percussive tracks. In one embodiment, process 1000 separates the audio track into harmonic and percussive tracks as described in FIG. 4 above. Process 1000 computes a percussive track perceptual Mel power spectrum at block 1004. In one embodiment, this power spectrum gives the transient features of the audio track and is computed as described in FIG. 4 above. Process 1000 computes a harmonic track perceptual Mel power spectrum at block 1006. In one embodiment, this power spectrum gives the timber features of the audio track and is computed as described in FIG. 4 above. Process 1000 computes a harmonic track perceptual CQT power spectrum at block 1008. In one embodiment, this power spectrum gives the notes features of the audio track and is computed as described in FIG. 4 above.

Figure 11:
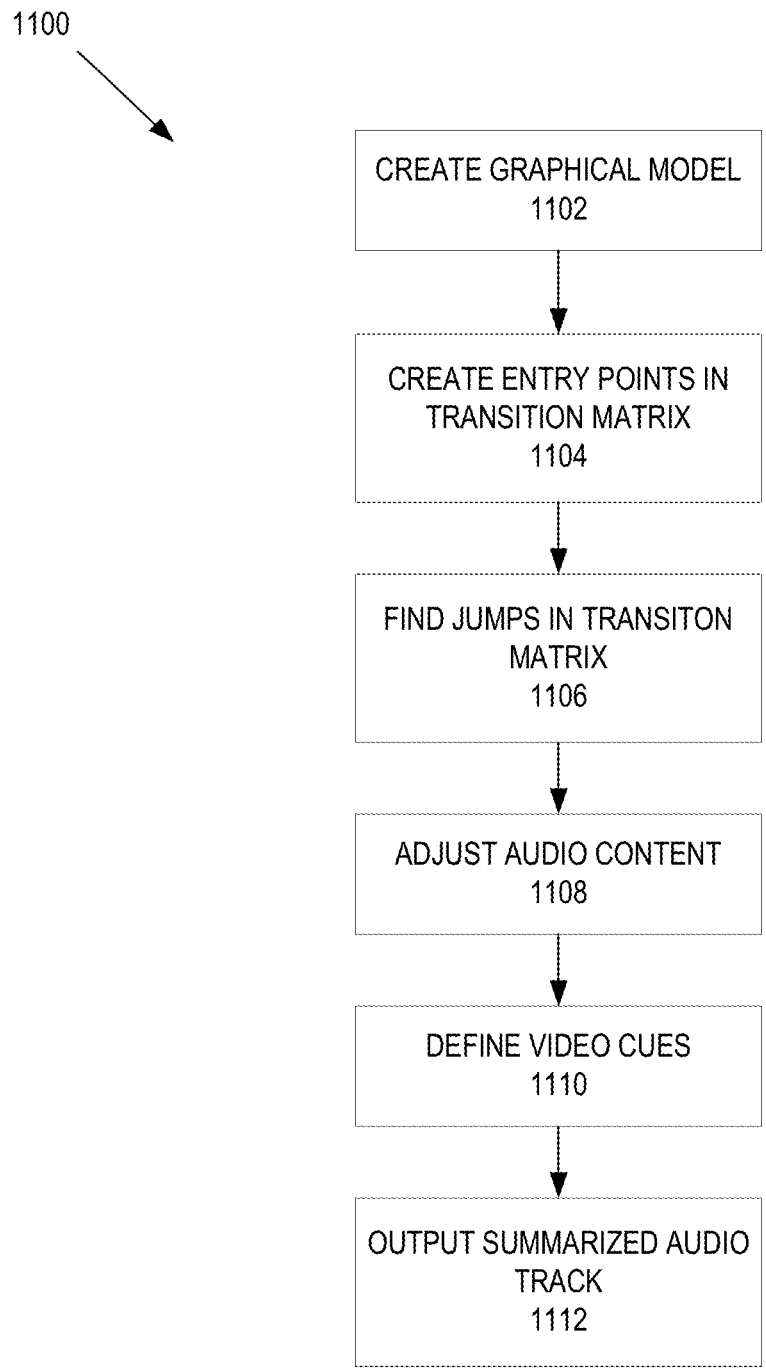
FIG. 11 is a flow diagram of one embodiment of a process to render a rearranged audio track using the transition matrix.

FIG. 11 is a flow diagram of one embodiment of a process 1100 to render a rearranged audio track using the transition matrix. In FIG. 11, process 1100 begins by creating a graphical model at 1102. At block 1104, process 1100 creates entry points in the audio track. In one embodiment, process 1100 creates the entry points by using a contiguous silence based model, a repetitions and boundary based model, and/or a learning based model as described in FIG. 3 above. Process 1100 finds jumps in the transition matrix at block 1106. In one embodiment, process 1100 finds the jumps in the transition matrix by using a similarity estimation and/or a transition estimation as described in FIG. 3 above.

At block 1108, process 1108 adjusts the audio content. In one embodiment, process 1100 adjusts the audio content using a deep neural network to use features at a higher level as described in FIG. 3 above. Process 1100 defines video cues at block 1110. In one embodiment, process 1100 defines the video cues using the beat scores, bars, segments, and/or sections as described in FIG. 3 above. Process 1100 outputs the rearranged audio track at block 1112.

Figure 12:
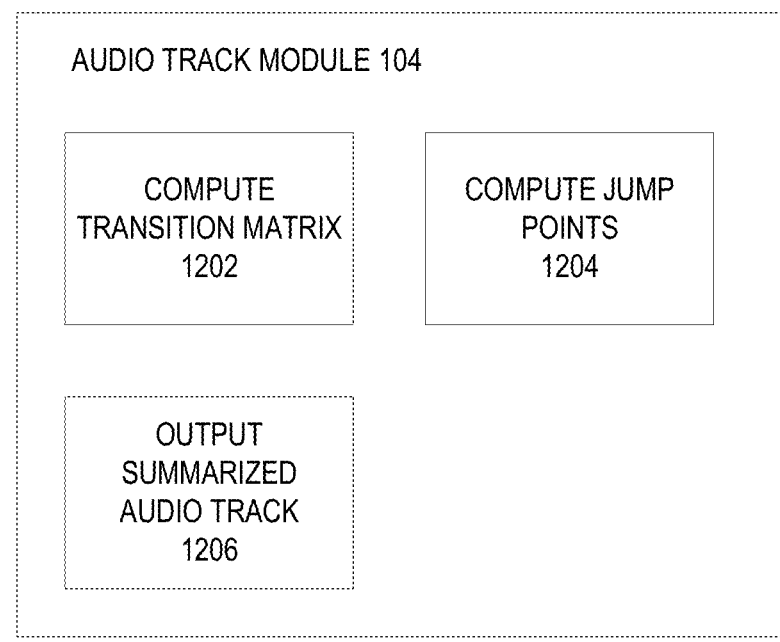
FIG. 12 is a block diagram of one embodiment of an audio track module that rearranges an audio track.

FIG. 12 is a block diagram of one embodiment of an audio track module 104 that rearranges an audio track. In FIG. 12, the audio track module 104 includes compute transition matrix module 1202, compute rearranged audio track module 1204, and output rearranged audio track module 1206. In one embodiment, compute transition matrix module 1202 computes the transition matrix for the audio track as described in FIG. 8, block 802 above. The compute rearranged audio track module 1204 computes the rearranged audio track as described in FIG. 8, block 804 above. The output rearranged audio track 1206 outputs the rearranged audio track.

Figure 13:
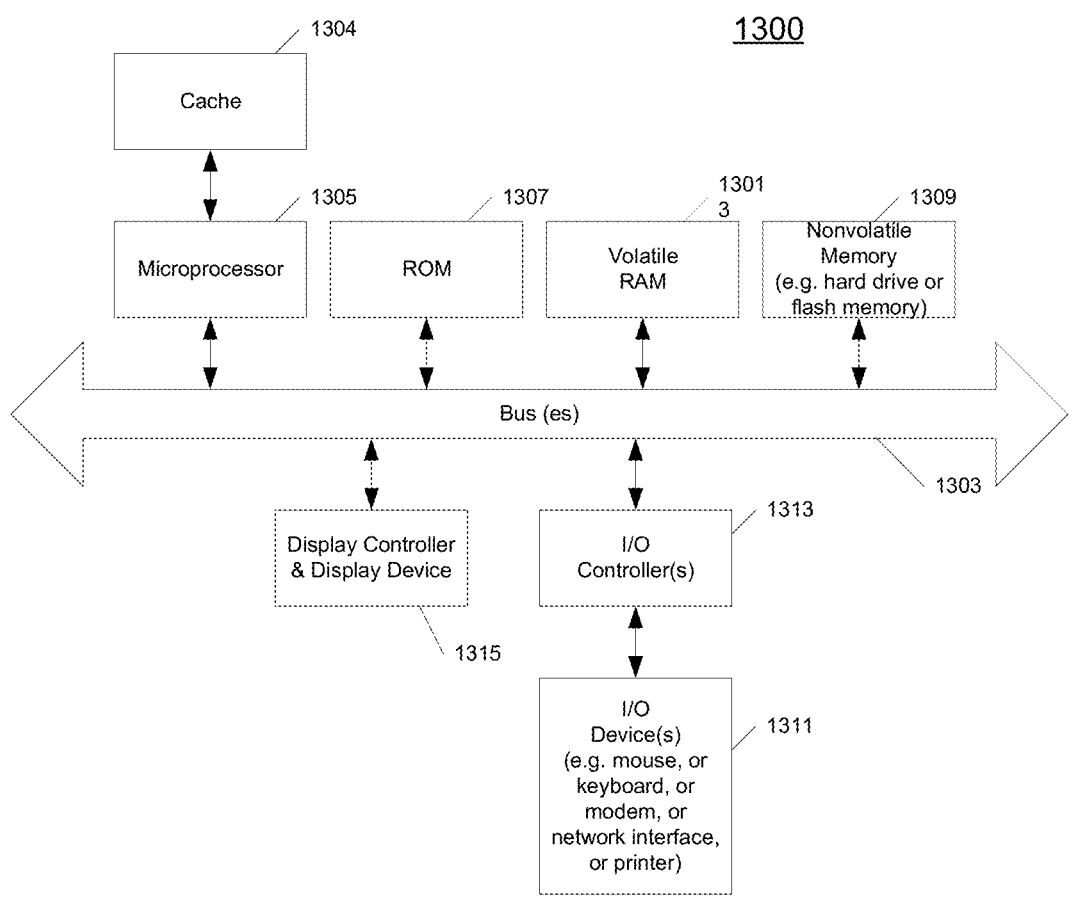
FIG. 13 illustrates one example of a typical computer system, which may be used in conjunction with the embodiments described herein.

FIG. 13 shows one example of a data processing system 1300, which may be used with one embodiment of the present invention. For example, the system 1300 may be implemented including a device 106 as shown in FIG. 1 above. Note that while FIG. 13 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 13, the computer system 1300, which is a form of a data processing system, includes a bus 1303 which is coupled to a microprocessor(s) 1305 and a ROM (Read Only Memory) 1307 and volatile RAM 1309 and a non-volatile memory 1311. The microprocessor 1305 may include one or more CPU(s), GPU(s), a specialized processor, and/or a combination thereof. The microprocessor 1305 may retrieve the instructions from the memories 1307, 1309, 1311 and execute the instructions to perform operations described above. The bus 1303 interconnects these various components together and also interconnects these components 1305, 1307, 1309, and 1311 to a display controller and display device 1319 and to peripheral devices such as input/output (I/O) devices which may be mice, keyboards, modems, network interfaces, printers and other devices which are well known in the art. Typically, the input/output devices 1315 are coupled to the system through input/output controllers 1313. The volatile RAM (Random Access Memory) 1309 is typically implemented as dynamic RAM (DRAM), which requires power continually in order to refresh or maintain the data in the memory.

The mass storage 1311 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1311 will also be a random access memory although this is not required. While FIG. 9 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1303 may include one or more buses connected to each other through various bridges, controllers and/or adapters as is well known in the art.

Figure 14:
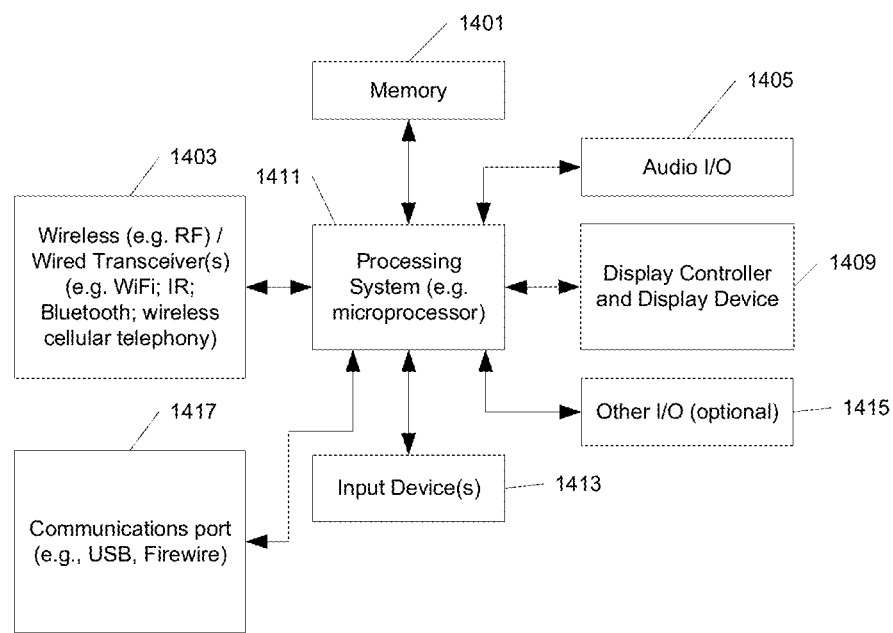
FIG. 14 shows an example of a data processing system, which may be used with one embodiment of the present invention.

FIG. 14 shows an example of another data processing system 1400 which may be used with one embodiment of the present invention. For example, system 1400 may be implemented as a device 106 as shown in FIG. 1 above. The data processing system 1400 shown in FIG. 14 includes a processing system 1411, which may be one or more microprocessors, or which may be a system on a chip integrated circuit, and the system also includes memory 1401 for storing data and programs for execution by the processing system. The system 1400 also includes an audio input/output subsystem 1405, which may include a microphone and a speaker for, for example, playing back music or providing telephone functionality through the speaker and microphone.

A display controller and display device 1409 provide a visual user interface for the user; this digital interface may include a graphical user interface which is similar to that shown on a Macintosh computer when running OS X operating system software, or Apple iPhone when running the iOS operating system, etc. The system 1400 also includes one or more wireless transceivers 1403 to communicate with another data processing system, such as the system 1400 of FIG. 14. A wireless transceiver may be a WLAN transceiver, an infrared transceiver, a Bluetooth transceiver, and/or a wireless cellular telephony transceiver. It will be appreciated that additional components, not shown, may also be part of the system 1400 in certain embodiments, and in certain embodiments fewer components than shown in FIG. 14 may also be used in a data processing system. The system 1400 further includes one or more communications ports 1417 to communicate with another data processing system, such as the system 1300 of FIG. 13. The communications port may be a USB port, Firewire port, Bluetooth interface, etc.

The data processing system 1400 also includes one or more input devices 1413, which are provided to allow a user to provide input to the system. These input devices may be a keypad or a keyboard or a touch panel or a multi touch panel. The data processing system 1400 also includes an optional input/output device 1415 which may be a connector for a dock. It will be appreciated that one or more buses, not shown, may be used to interconnect the various components as is well known in the art. The data processing system shown in FIG. 14 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1400 may be a network computer or an embedded processing device within another device, or other types of data processing systems, which have fewer components or perhaps more components than that shown in FIG. 14.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "identifying," "receiving," "computing," "executing," "chunking," "generating," "removing," "creating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to rearrange an input audio track into a rearranged audio track, the method comprising:
   receiving an input audio track having a first duration, the input audio track having a plurality of points;
   generating a transition matrix of the input audio track, wherein the transition matrix indicates a similarity metric between different pairs of the plurality of points;
   determining a set of jump points using the different pairs of the plurality of points; and
   generating the rearranged audio track using the set of jump points, wherein the rearranged audio track has a second duration, the second duration is different than the first duration, and the rearranged audio track is a set of non-contiguous audio subsets of the input audio track that are coupled via the set of jump points.

2. The non-transitory machine readable medium of claim 1, wherein a jump point is a jump from one point in the input audio track to another point in the input audio track.

3. The non-transitory machine-readable medium of claim 1, wherein a point in the plurality of points is selected from the group consisting of a beat, a bar, a segment, and a section.

4. The non-transitory machine readable medium of claim 1, further comprising:
   computing the transition matrix.

5. The non-transitory machine readable medium of claim 4, wherein computing the transition matrix comprises:
   decomposing the input audio track into a percussive track and a harmonic track; and
   chunking the percussive track and a harmonic track into input features via the computation of a perceptual Mel power spectrograms and perceptual CQT power spectrograms that captures different audio.

6. The non-transitory machine readable medium of claim 4, wherein the input features include transients, timber, and pitches.

7. The non-transitory machine readable medium of claim 4, further comprising:
   computing the transition matrix using the input features using machine learning.

8. The non-transitory machine readable medium of claim 1, further comprising:
determining a starting point for the rearranged audio track.

9. The non-transitory machine readable medium of claim 7, wherein the starting point is after a starting point of the input audio track.

10. The non-transitory machine readable medium of claim 1, further comprising:
determining an ending point for the rearranged audio track.

11. The non-transitory machine readable medium of claim 1, further comprising:
generating a set of video cues for the rearranged audio track.

12. A method to rearrange an input audio track into a rearranged audio track, the method comprising:
receiving an input audio track having a first duration, the input audio track having a plurality of points;
generating a transition matrix of the input audio track, wherein the transition matrix indicates a similarity metric between different pairs of the plurality of points;
determining a set of jump points using the different pairs of the plurality of points; and
generating the rearranged audio track using the set of jump points, wherein the rearranged audio track has a second duration, the second duration is different than the first duration, and the rearranged audio track is a set of non-contiguous audio subsets of the input audio track that are coupled via the set of jump points.

13. The method of claim 12, wherein a jump point is a jump from one point in the input audio track to another point in the input audio track.

14. The method of claim 12, wherein a point in the plurality of points is selected from the group consisting of a beat, a bar, a segment, and a section.

15. The method of claim 12, further comprising:
computing the transition matrix.

16. The method of claim 15, wherein computing the transition matrix comprises:
decomposing the input audio track into a percussive track and a harmonic track; and
chunking the percussive track and a harmonic track into input features via the computation of a perceptual Mel power spectrograms and perceptual CQT power spectrograms that captures different audio.

17. The method of claim 16, wherein the features include transients, timber, and pitches.

18. The method of claim 16, further comprising:
computing the transition matrix using the input features using machine learning.

19. The method of claim 12, further comprising:
determining a starting point for the rearranged audio track.

20. The method of claim 19, wherein the starting point is after a starting point of the input audio track.

21. A device that rearranges an input audio track into a rearranged audio track, the device comprising:
at least one processing unit;
memory coupled to the at least one processing unit; and
a process executed from the memory by the processing unit that causes the at least one processing unit to receive an input audio track having a first duration, the input audio track having a plurality of points, generate a transition matrix of the input audio track, wherein the transition matrix indicates a similarity metric between different pairs of the plurality of points, determine a set of jump points using the different pairs of the plurality of points, and generate the rearranged audio track using the set of jump points, wherein the rearranged audio track has second duration, the a second duration is different than the first duration, and the rearranged audio track is a set of non-contiguous audio subsets of the input audio track that are coupled via the set of jump points.

* * * * *